United States Patent

[11] 3,572,882

[72] Inventor Don B. Neumann
    Ann Arbor, Mich.
[21] Appl. No. 880,624
[22] Filed Nov. 28, 1969
[45] Patented Mar. 30, 1971
[73] Assignee The United States of America as represented by the Secretary of the Air Force

[54] VARIABLE REFERENCE PHASE HOLOCAMERA TO COMPENSATE FOR OBJECT MOTION
2 Claims, 3 Drawing Figs.

[52] U.S. Cl.................................................. 350/3.5,
    356/106, 250/201
[51] Int. Cl....................................................... G02b 27/00
[50] Field of Search............................................. 350/3.5;
    356/106; 250/201 (Inquiry); 178/(Inquiry)

[56] References Cited
UNITED STATES PATENTS
3,494,698 2/1970 Neumann..................... 350/3.5

OTHER REFERENCES
Neumann et al., Applied Optics, Vol. 6, No. 6, June 1967 pp 1097—1104

Neymann, Jour of the OPTICAL SOCIETY of AMERICA, Vol. 58, No. 4, April 1968, pp. 447—454
Denisyuk et al, SOVIET JOUR OF OPTICAL TECHNOLOGY, Vol. 36, No. 6, Nov. 1968 pp 747—748

*Primary Examiner*—David Schonberg
*Assistant Examiner*—Ronald J. Stern
*Attorneys*—Harry A. Herbert, Jr. and Richard J. Killoren ABSTRACT: A variable reference phased holographic system for recording holograms of objects having some movement with respect to the photographic plate which has the conventional signal beam and reference beam provided by a beam splitter having a phase shifter in the reference beam path to adjust the phase of the reference beam to correspond to phase shifts in the signal beam at the center of the hologram recording plate due to the movement of the object. The reference beam is brought to a focus and passed through an aperture between the phase shifter and hologram recording plate. The aperture is moved to adjust the reference beam for phase shifts in the signal beam at points not at the center of the hologram recording plate. In one embodiment the phase corrections are made by sensing means which sense movement of interference fringes at the center and one edge of the hologram recording plate with the output of the sensing means being applied to phase shifters in the reference beam.

VARIABLE REFERENCE PHASE HOLOCAMERA TO COMPENSATE FOR OBJECT MOTION

BACKGROUND OF THE INVENTION

Holography is a technique by which the light field scattered from a scene can be recorded so that the scene can be reproduced at a later time. In the past the scene, to be recorded by holography, has been a stationary scene. However there are times that the scene, for which a hologram recording is desired, has some movement relative to the recording device during the recording time. Such scenes cannot be recorded with prior art holography systems without blurring of the image.

SUMMARY OF THE INVENTION

According to this invention holograms of moving objects are formed by having the light arriving from the scene which has been illuminated by a laser, collected by a lens and directed to the hologram. A reference beam is provided in the usual manner by means of a beam splitter in the laser beam illuminating the scene. The phase of the reference beam is varied at each point of the hologram to allow the instantaneous phase of the reference to be adjusted to that of the scene light at each point of the hologram.

IN THE DRAWING

FIG. 3 is a schematic diagram of the fringe motion sensing device for the device of FIG. 2.

Figure 1:
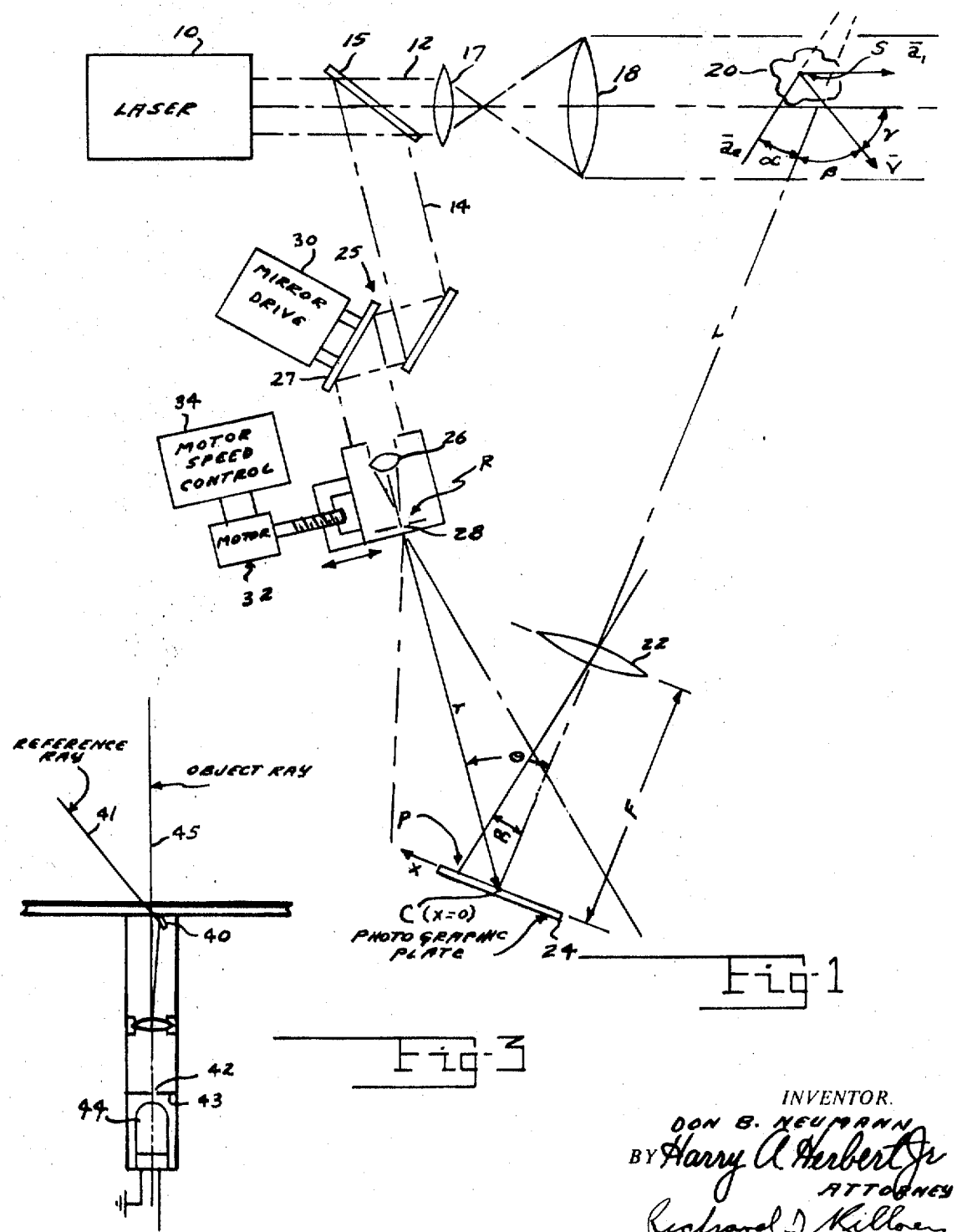
FIG. 1 is a schematic diagram showing a variable reference phased holographic system according to the invention.
Figure 2:
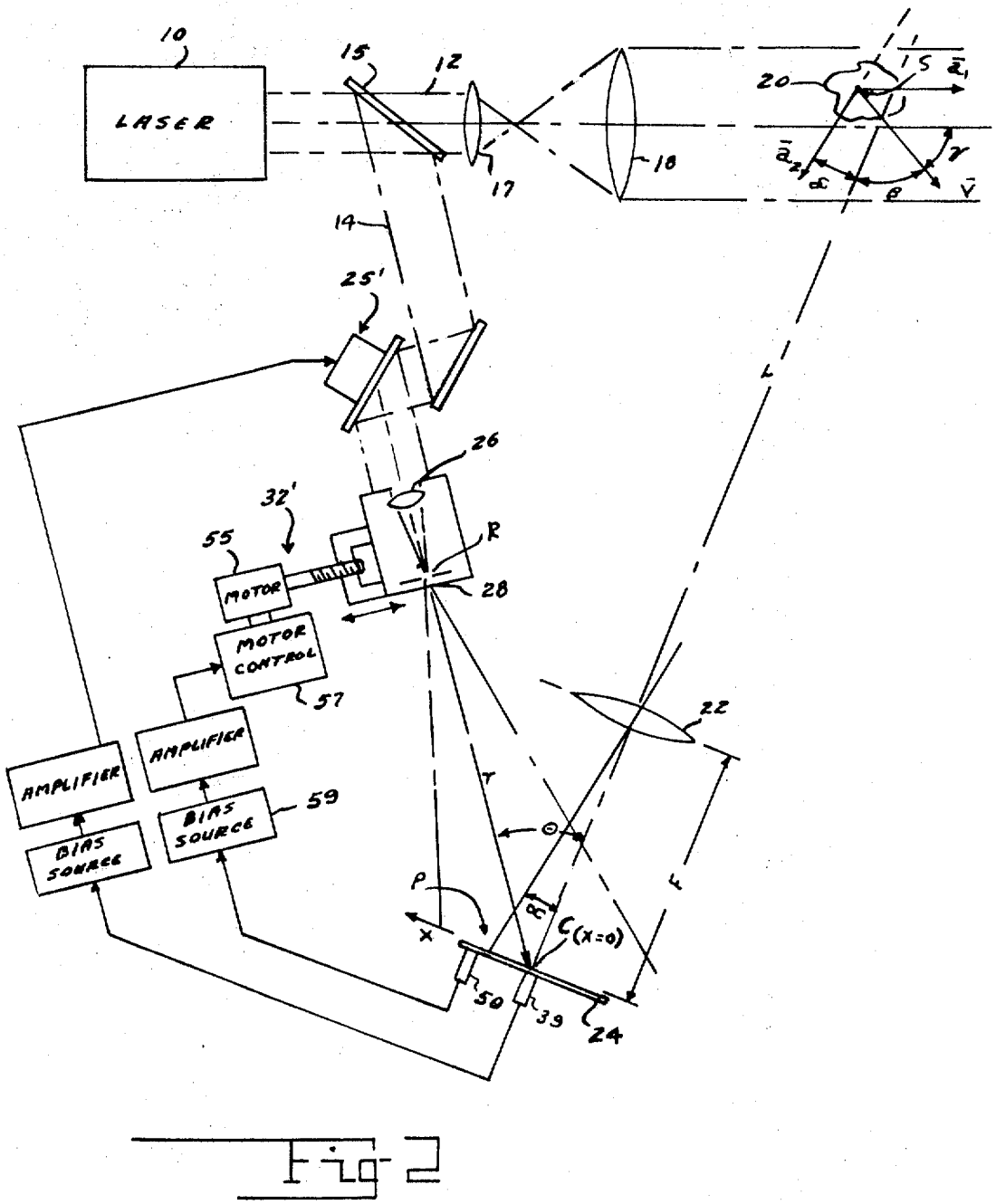
FIG. 2 is a schematic diagram showing a modification of the variable phase holographic system of FIG. 1.

Reference is now made to FIG. 1 of the drawing wherein light emitted by a laser shown schematically at 10 is split into a signal beam 12 and a reference beam 14 by a beam splitter 15. The signal beam 12 is passed through a pair of lenses 17 and 18 to form a collimated beam with a diameter great enough to cover the object 20, in each position it will occupy during the exposure. Light scattered from the object is collected by a lens 22 and focused onto a photographic plate 24 positioned in the back focal plane of lens 22. The reference beam 14 is passed through a phase shifter 25 and a lens 26 to illuminate a pinhole 28. The phase shifter may be either a transmission device such as a Kerr cell or it may be a reflective type of phase shifter such as a mirror 27 driven by a mirror drive 30. Light passing through the pinhole 28 diverges to cover the photographic plate 24 and serves as a reference beam, in the formation of the hologram. The position of pinhole aperture 28 is adjusted by a motor drive system 32 which is controlled by a motor speed control 34.

In the operation of the device of the invention assume that the object 20 is translating with a constant velocity indicated by the vector $v$. For the purpose of this explanation it is assumed that $v$ is in the plane of the paper. The discussion will be given with regard to the point S on the object. The results for other points may be obtained by superposition. Let $a_1$ be a unit vector in the direction of the illumination from the laser and let $a_2$ be a unit vector, pointing toward the plane of the photographic plate 24, parallel to a line through the center of lens 22 and passing through a point P on the photographic plate 24. Light arriving at point P will be Doppler shifted due to the changing path length from the laser caused by the moving object. The rate of shift $d\Phi/dt$ is given by the following expression:

$$\frac{d\phi}{dt} = K[\bar{v}\cdot\bar{a}_1 - \bar{v}\cdot\bar{a}_2] \quad (1)$$

$$\frac{d\phi}{dt} = Kv[(\cos\gamma - \cos(\beta+\alpha)] \quad (2)$$

$$\frac{d\phi}{dt} = Kv[\cos\gamma - \cos\beta\cos\alpha + \sin\beta\sin\alpha] \quad (3)$$

where $\gamma$ is the angle between the velocity vector $v$ and unit vector $a_1$, $\beta$ is the angle between the velocity vector $\bar{v}$ and a line L through the center of lens 22 and the center C of photographic plate 24, $\alpha$ is the angle between line L and the unit vector $a_2$, and K is the propagation constant =

$$\frac{2\pi}{\text{wavelength of light}}$$

For small angles of $\alpha$ of 6° and less, expression (3) may be written as follows:

$$\frac{d\phi}{dt} = Kv\left[\cos\gamma - \cos\beta + \frac{x}{F}\sin B\right] \quad (4)$$

where $x$ is the distance between point P and the center of the photographic plate 24 and $F$ is the focal length of lens 22.

In order to obtain stationary interference fringes, it is necessary to match the above phase shift with a similar phase shift for the reference beam. This may be accomplished at point C where $X=0$ by causing the phase shifter 25 to have a phase shift $$\left(\frac{d\phi_R}{dt}\right)_1 = Kv(\cos\gamma - \cos\beta) \quad (5)$$

The proper phase shift signal to be applied to phase shifter 25 therefore can be determined by knowing the magnitude and direction of the velocity vector $v$.

While phase shifter 25 is shown as located in the reference beam, this phase shifter could be located in the signal beam with the change in phase correction being made in the opposite direction. That is, the change in path length at the center of the hologram in the signal beam due to movement of the object can be changed either by providing a corresponding change in optical path length in the reference beam or by providing a compensating change in the signal beam opposite to the change caused by the movement by the object.

To make the fringes stationary at points $x \quad O$ on the photographic plate 24, it is necessary to move the reference point R transverse to the incident laser beam from the object. The reference phase shift can be given by the expression:

$$\left(\frac{d\phi_R}{dt}\right)_2 = \frac{KV_R x \cos\theta}{r} \quad (6)$$

From expressions (4) and (6) stationary fringes will result at points $x \quad O$ when:

$$\frac{V_R \cos\theta}{r} = \frac{v\sin\beta}{F} \quad (7)$$

From this the proper velocity $V_R$ for the reference point R may be computed when the magnitude and direction of the velocity vector $v$ of the object 20 is known.

In one device tested, the following values were used:

$v$=3.18 mm/min
$\gamma$=36°
$\beta$=36°
$F$=80 cm.
$\theta$=30°
$r$=59 cm.

From expression (5) it can be seen that $$\left(\frac{d\phi_R}{dt}\right)_1 = 0$$

Therefore no movement of mirror 27 is required.

When the object 20 does not move with a constant velocity, the mirror 27 will not be moved at a constant velocity but would move with a variable velocity determined in accordance with expression (5).

From expression (7) for the above example the velocity $V_R$ is found to be 1.59mm/min. Thus motor speed control 34 for motor 32 would be set to move pinhole 28 or point R 1.59mm/min.

For motions large enough that the extreme positions of pinhole 28 subtend an angle larger than 6° at the center of the photographic plate, it will be necessary to move the pinhole along a parabolic arc (equidistant at a distance $r$ from point C and some plane wavefront in beam 14). For angles less than 6°, motion can be linear since changes in the distance $r$ between the pinhole 28 and the center of the photographic plate 24 will be negligible. When when the magnitude and direction of the velocity vector is not known some other means must be provided for determining the signal to be applied to the phase shifter and to the motor drive system to move the reference point R.

From expression (6) it can be seen that movement of reference point R does not contribute to the phase shift at the center C of plate 24 where $x = 0$. Thus the correction signal applied to the phase shifter 25 may be obtained by sensing fringe movement at the center of the plate 24, by means of a sensor 39 in a manner similar to that described in applicant's copending application Serial No. 618,302, now U.S. Pat. No. 3,494,698. As shown in FIG. 3, a mirror 40 directs the reference ray 41 toward a slit 42 in mask 43 which is located in the path of the object ray 45. A short focal length lens 46 magnifies the fringe pattern as in applicant's copending application. The output of the photocell may be used to adjust phase shifter 25' in the manner described in applicant's copending application.

A signal to position the reference point R may be obtained in the same manner by positioning a sensor 50, as described above, near the edge of plate 24, with the output of the photocell used to control the speed of motor 55 through a motor control circuit 57 in the conventional manner in response to an error signal from bias source 59.

The device thus far described relates to motion in only the plane of the paper. For motion perpendicular to the plane of the paper, reference point R would be moved in the direction perpendicular to the paper in the same manner as described above.

There is thus provided a device which makes it possible to record holograms when the scene to be recorded has some movement relative to the recording device during the recording time.

I claim:

1. In a holocamera system having a hologram photographic recording plate; a laser providing a beam of coherent light; means, in said beam for directing a first light beam toward an object moving with a velocity represented by a vector $v$ for which a hologram is desired whereby light scattered by said object is directed toward said photographic plate and a second reference light beam directed toward said photographic plate; a first lens between said object and said photographic plate for collimating the light scattered by said object; wherein the phase of the light reaching the photographic plate from the moving object is changed due to the velocity of the object as given by the expression:

$$\frac{d\phi}{dt} = Kv\left[\cos\gamma - \cos\beta + \frac{x}{F}\sin\beta\right]$$

where $K$ is the propagation constant; $v$ is the absolute speed of the object; $\gamma$ is the angle between the velocity vector $v$ and the axis of said first beam; $\beta$ is the angle between the velocity vector $v$ and a line L from the center of the photographic plate; passing through the center of the lens; $F$ is the focal length of said lens; $x$ is the distance from the center of the photographic plate and an illumination point P on the plate; and apparatus for providing a compensating phase shift in at least one of said beams; the improvement comprising: a first phase shifting means in one of said beams, for compensating for the portion of the phase change due to the velocity of the object given by the expression:

$$\frac{d\phi}{dt} = Kv[\cos\gamma - \cos\beta]$$

and a second phase shifting means in the reference beam for compensating for the portion of the phase change due to the velocity of the object given by the expression:

$$\frac{d\phi}{dt} = Kv\left[\frac{x}{F}\sin\beta\right]$$

said second phase shifting means includes a mask having an aperture, a second lens for focusing the reference beam at the aperture and means for moving the second lens and aperture substantially perpendicular to the axis of the beam with a movement described by the following expression:

$$\frac{KV_R x \cos\theta}{r} = Kv\frac{x}{F}\sin\beta$$

where $V_R$ is the velocity of the second lens and aperture; $r$ is the distance between the aperture and the center of the the photographic plate; $x$ is the distance from the center of the photographic plate to an illumination point P on the plate; and $\theta$ is the angle between $r$ and a line L from the center of the photographic plate passing through the center of the first lens.

2. The device as recited in claim 1 wherein said means for directing the first beam toward the object and the second reference beam toward the photographic plate is a beam splitter and wherein said first phase shifting means is located in said reference beam between the beam splitter and the second phase shifting means.